Patented Apr. 11, 1950

2,503,763

UNITED STATES PATENT OFFICE 2,503,763

TOASTED COCONUT CHIPS AND PROCESS OF PRODUCING SAME

Thomas B. O'Leary, Miami, Fla., assignor to Evelyn Turner O'Leary, Miami, Fla.

No Drawing. Application May 8, 1948, Serial No. 25,989

5 Claims. (Cl. 99—125)

1

The invention relates to improvements in a coconut confection, and to a process for the production thereof.

The confection to which the invention may be applied, in particular, consists of salted, toasted, coconut chips, having utility as a delicacy to be served with beer and the like.

Among essential characteristics of such a confection are crispness of consistency, saltiness of taste, and freedom from excessive adhesion thereto of salt crystals resulting from the application of salt, by sprinkling, during the process of preparing the coconut batch.

One of the objects of the invention is to provide a coconut confection of the character and for the purposes described, which will be crisp, smooth as to surface texture and saline to taste.

Another object is to provide a toasted coconut confection which will be free from excessive adhesion thereto of salt crystals to thereby avoid the transfer of objectionable particles to the fingers of the consumer when handling the finished product.

A further object is to provide a process for the production of salted, toasted coconut chips, which may be readily and economically practiced.

Other advantages of the invention will be discerned from the description thereof hereinafter set forth.

According to the invention, fresh or prepared coconut is combined with salt and the natural oils in the coconut meat utilized to produce a crisp, smooth and saline tasting chip by oven toasting.

The raw coconut meat may be taken from the husk and shell by any convenient method and sliced to produce ribbon, chip, or wafer-like flakes. Prepared coconut in slices or shreds may likewise be employed.

The raw batch thus prepared is then immersed in a brine solution to undergo a pickling operation. I prefer to utilize a solution of about 10 degrees Baumé, varying the time of immersion in accordance with the concentration of the brine solution. I have found that good results may be obtained by using a 5 degree Baumé solution for 24 to 36 hours, or a 20 degree Baumé solution for as short a pickling time duration as 1 hour.

Following the pickling of the batch, the brine is drained therefrom and the excess moisture is removed from the coconut by any suitable method, such as sun drying, tumbling, or dehydration in a chamber of conventional design or arrangement.

2

The dehydrated product is then passed through an oven chamber in which a train of conveyor belts may be arranged to conduct the chips therethrough. I prefer to use a temperature of about 350 degrees F. but satisfactory results may be obtained by varying the temperature between 150 degrees F. and 500 degrees F. in accordance with the time duration of the passage of the product through the oven. This step, which accomplishes the toasting of the chips, may be carried on between electric coils or flame jets.

The jets or coils may be arranged so as to direct the heat therefrom toward the top or bottom of the batch, or both.

The toasted chips may then be packaged according to any conventional practice.

The invention thus provides a confection of the character and for the purposes described, which is pleasing to the taste, crisp in consistency, and free from objectionable salt particle on the surface thereof.

The subjection of the coconut batch to the pickling operation, as distinguished from salting by sprinkling, or by merely applying salt to the coconut meat in conventional preserving methods, serves to impart desirable saline taste properties to the coconut chips produced by my process, without resulting in a finished product having the surface thereof impaired by objectionable salt crystals.

Having thus described the invention and the practice of the process therefor, what I claim as new and desire to secure by Letters Patent is:

1. The process of producing toasted coconut chips which comprises the steps of slicing raw coconut meat to produce wafer-like chips, pickling the chips in a brine solution, dehydrating the salted chips, and subjecting the dehydrated chops to heat by toasting.

2. The herein described process of producing toasted coconut chips which comprises the steps of pickling raw coconut chips in a brine of 5 degree Baumé solution for 24 to 36 hours, dehydrating the salted chips and subjecting the dehydrated chips to heat by toasting.

3. The herein described process of producing toasted coconut chips which comprises the steps of pickling raw coconut chips in a brine of 20 degree Baumé solution for one hour, dehydrating the salted chips and subjecting the dehydrated chips to heat by toasting.

4. The herein described process of producing toasted coconut chips which comprises the steps of pickling raw coconut chips in a brine of from 20 degrees Baumé solution for one hour to 5 degree Baumé solution for 24 to 36 hours, dehydrating the salted chips and subjecting the dehydrated chips to heat by toasting.

5. The herein described toasted coconut chips which are characterized by smooth surface texture, relative freedom from coarse granular crystals adhering thereto, crispness in consistency and saline to taste.

THOMAS B. O'LEARY.

REFERENCES CITED

The following references are of record in the file of this patent:

UNITED STATES PATENTS

| Number | Name | Date |
|---|---|---|
| 1,374,880 | Cookson | Apr. 12, 1921 |
| 2,322,880 | Pollak | Jan. 29, 1943 |